(12) United States Patent
Lui

(10) Patent No.: US 6,305,156 B1
(45) Date of Patent: Oct. 23, 2001

(54) INTEGRATED BLEED AIR AND ENGINE STARTING SYSTEM

(75) Inventor: Clarence Lui, Diamond Bar, CA (US)

(73) Assignee: AlliedSignal Inc., Morristown, NJ (US)

( * ) Notice: Subject to any disclaimer, the term of this patent is extended or adjusted under 35 U.S.C. 154(b) by 0 days.

(21) Appl. No.: 09/390,412

(22) Filed: Sep. 3, 1999

(51) Int. Cl.$^7$ .................................. F02C 6/08; F02C 7/27
(52) U.S. Cl. ..................... 60/39.07; 60/39.142; 454/76
(58) Field of Search .................... 60/39.07, 39.141, 60/39.142, 39.33; 454/71, 76

(56) References Cited

U.S. PATENT DOCUMENTS

| | | |
|---|---|---|
| 2,777,301 * | 1/1957 | Kuhn ...................... 60/39.07 |
| 3,965,673 * | 6/1976 | Friedrich .................. 60/39.142 |
| 4,684,081 | 8/1987 | Cronin . |
| 4,916,893 | 4/1990 | Rodgers . |
| 5,125,597 | 6/1992 | Coffinberry . |
| 5,136,837 | 8/1992 | Davison . |
| 5,137,230 * | 8/1992 | Coffinberry ............... 60/39.142 |
| 5,143,329 | 9/1992 | Coffinberry . |
| 5,363,641 | 11/1994 | Dixon et al. . |
| 5,414,992 | 5/1995 | Glickstein . |
| 5,490,645 | 2/1996 | Woodhouse . |
| 5,967,461 * | 10/1999 | Farrington ................. 454/76 |

* cited by examiner

Primary Examiner—Louis J. Casaregola
(74) Attorney, Agent, or Firm—William J. Zak, Jr., Esq.

(57) ABSTRACT

An integrated bleed air and engine starting system for an engine utilizes an innovative flow multiplier air turbine starter to provide bleed air supply to an ECS as well as starting an engine. The technique reduces bleed air consumption by mixing fan stage air and high stage air for ECS fresh air usage. It also can eliminate or reduce the size of the precooler heat exchanger. The system includes an air turbine starter subsystem and an air flow subsystem. The air turbine starter subsystem includes a compressor, a turbine, and a common shaft fixed between the compressor and turbine. Also provided is a gear coupled to a gearbox which links the engine with a shaft, as well as a variable nozzle valve intermediate the turbine and engine. The air flow subsystem comprises a diverter valve downstream of the turbine, an isolation valve intermediate the turbine and an auxiliary power unit, and a check valve downstream of the compressor and turbine. A fan is in air flow communication with the compressor and engine.

17 Claims, 2 Drawing Sheets

INTEGRATED BLEED AIR AND ENGINE STARTING SYSTEM

BACKGROUND OF THE INVENTION

The present invention relates to systems for supplying air to start an engine and fresh air to a cabin, such as in aircraft. More specifically, the present invention relates to an integrated bleed air and engine starting system that minimizes fuel penalties associated with the use of bleed air.

Efficiency in aircraft design remains an ever-present concern. Yet, future aircraft designs remain focused on reducing unit costs and operating costs. The design trend is to integrate system functions to reduce duplicate components to thereby reduce the unit cost. An approach to reducing operating costs is to lower the fuel consumption by designing a higher efficiency system.

In terms of operating efficiency, anti-ice systems and environmental control systems of aircraft typically operate with bleed air at intermediate or high pressures from gas turbine engines. But utilizing bleed air to operate these systems and their components results in operating penalties or, in other words, reduced engine efficiency. In particular, the penalty is increased fuel consumption. For instance, bleed air taken from an engine compressor is usually cooled and the pressure regulated before its ultimate use. Typically, engine fan air or ram air is used to cool the bleed air through a heat exchanger, which will have a negative impact to the engine and aircraft performance. The heat exchanger imposes a weight penalty to the aircraft. The bleed air taken from the engine for environmental control system (ECS) usage usually has a pressure higher than what the ECS needs. Thus, the pressure is regulated in a pressure regulator and throttled at a flow control valve to meet the ECS demand. Throttling the bleed pressure, however, means a waste of energy and imposes a fuel penalty to the aircraft.

A past attempt to lower the unit cost by integrating engine starting and thermal management is found in U.S. Pat. No. 5,363,641 wherein a starter compressor and a starter turbine are linked through a shaft to an engine. An auxiliary power unit provides air to the starter compressor which, in turn, provides compressed air to an auxiliary burner during a start mode or a heat exchanger during an operating mode. In the start mode, fuel is also fed to the auxiliary burner for combustion, with the combustion products then being flowed to the starter turbine. As the starter turbine accelerates, the starter compressor, in turn, accelerates. The starter compressor then accelerates the shaft to a high compressor in the engine until the engine becomes self-sustaining. In the operating mode, the shaft between the starter compressor and the engine are disengaged via a clutch. The compressed air from the starter compressor is flowed into a heat exchanger. From the heat exchanger, the air moves to the starter turbine, expanded, and then flowed to cool engine components. A disadvantage to this design, however, includes the fact that the turbine discharge air cannot be used for passenger breathing because of contamination during the starting mode.

In U.S. Pat. Nos. 5,143,329 and 5,125,597, during ground start operation of one engine, a starting turbine receives compressed air from a starting air supply such as bleed air from another engine and discharges the air overboard. The starting turbine consequently cranks a high pressure turbine shaft within the engine until the engine can continue operation off of an engine compressor and without assistance from the starter turbine, although the starter turbine remains connected to the turbine shaft. During flight, a primary heat exchanger of an ECS receives an outlet flow from the starting turbine. The flow from the primary heat exchanger moves through a compressor, a secondary heat exchanger, and then an ECS turbine. From the ECS turbine, the air can be used to cool a cabin. A drawback of this design is that the pressure of the compressed boundary layer flow is too low for ECS operation and, thus, does not offer bleed air reduction for fuel savings.

Boundary layer bleed air is used in U.S. Pat. No. 5,136,837; to feed a compressor. During cruise operation, the compressor provides compressed air to a turbine and the outlet from the turbine is then used for cooling. During start-up, air to the turbine can be supplied from a ground supply or auxiliary power unit. The turbine outlet flow can then pass into the engine. Limitations in this design, however, include the fact that the turbine cooling flow is unmixed and is supplied for engine cowl cooling. Also, there is no mention in reducing the bleed air penalty associated with cabin fresh air supply.

Other related disclosures include U.S. Pat. Nos. 5,490,645; 5,414,992; 4,916,893; and 4,684,081.

As can be seen, there is a need for an improved integrated system for supplying bleed air and starting an engine. Also needed is a system that supplies air not only to start an engine but also to supply air to an environmental control system. Another need is for a system that can start an engine while minimizing associated fuel penalties. In that latter regard, there is a need for an engine starting system that minimizes fuel penalties by maximizing the use of existing aircraft components. A further need is for a system that can multiply an air flow to supply an environmental control system, thereby lowering flow mixing temperatures and reducing a high stage bleed penalty. A particular need is for an integrated system of bleed air supply and engine starting.

SUMMARY OF THE INVENTION

In one aspect of the present invention, an integrated bleed air and engine starting system for an engine comprises an air turbine starter subsystem having a compressor and a turbine coupled to one another and to the engine; and an air flow subsystem that optionally directs the bleed air through the turbine or around the turbine and to an environmental control system and that also enables an auxiliary air flow from an auxiliary power unit to be optionally received by the turbine.

In another aspect of the invention, an integrated bleed air and engine starting system for an engine comprises an air turbine starter subsystem having a compressor, a turbine, a common shaft fixed between the compressor and turbine, a gear fixed between the common shaft and engine, and a variable nozzle valve intermediate the turbine and engine; an air flow subsystem having a diverter valve downstream of the turbine, an isolation valve intermediate the turbine and an auxiliary power unit, and a check valve downstream of the compressor and turbine; and a fan in air flow communication with the compressor and engine.

These and other features, aspects and advantages of the present invention will become better understood with reference to the following drawings, description and claims.

DETAILED DESCRIPTION OF THE INVENTION

While a preferred embodiment of the present invention is described below in the context of aircraft, the present invention is not intended to be so limited. Further, while the present invention is described, in part, by contrasting it to a particular prior art design, the advantages achieved by the present invention are not intended to be limited to those described in relation to such prior art design.

Figure 1:
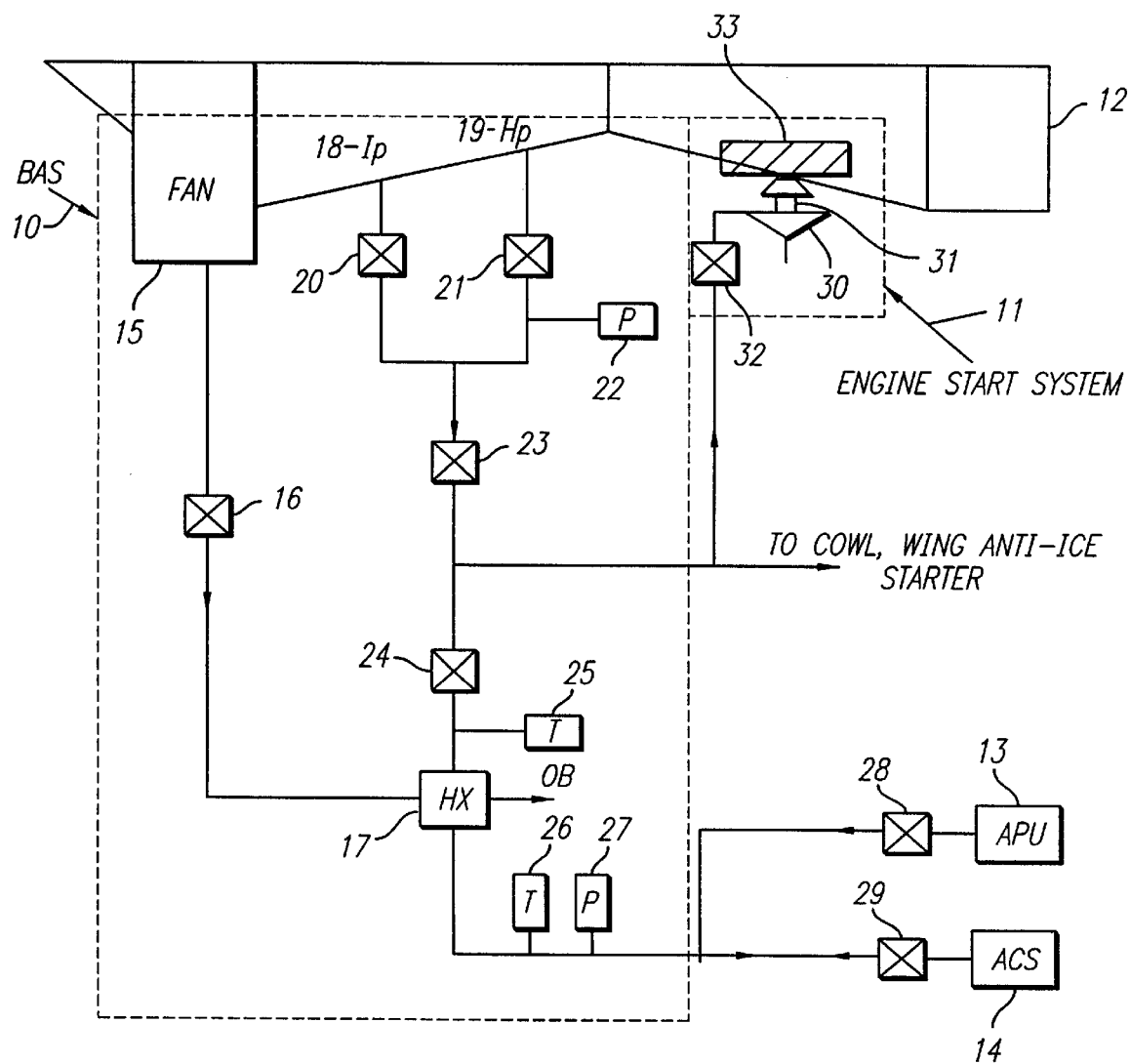
FIG. 1 is a schematic diagram of a prior art system for providing bleed air and a separate engine starting system.

To better illustrate some of the advantages of the present invention, FIG. 1 is provided to schematically show a frequently used design in the art that provides air to an environmental control system and air to start an engine. The prior art design includes a bleed air system 10 (marked with dashed lines in FIG. 1) that is separate from an engine start system 11 (marked with separately dashed lines).

During an aircraft cruising mode, an intermediate pressure (Ip) air 18 or a high pressure (Hp) air 19 flows from an engine 12. The Ip air 18 passes through a check valve 20, a shut off valve 23, a pressure regulator 24, a temperature sensor 25, and then cooled in a heat exchanger 17. From the heat exchanger 17, the Ip air 18 passes a temperature sensor 26 and a pressure sensor 27. Alternatively, the Hp air 19 moves through a high pressure valve 21, a pressure sensor 22, and then into the shut off valve 23. Thereafter, the Hp air 19 flows the same as the Ip air 18 until reaching the pressure sensor 27. If the Ip air 18 or the Hp air 19 require cooling, the flow from a fan 15 moves through a fan air valve 16, to the heat exchanger 17, and then overboard. Whether from the Ip air 18 or the Hp air 19, the flow moves into a flow control valve 29 and then to an air cycle system 14 of an environmental control system.

During a start mode in the prior design shown in FIG. 1, a high pressure pneumatic air from an auxiliary power unit 13 flows through a shut off valve 28, eventually through the pressure regulator 24, and then another shut off valve 32. The outlet from the shut off valve 32 leads to an air turbine starter 30 that is coupled to an engine gearbox 33 by a gear shaft assembly 31 which is linked to the engine 12, thereby enabling the engine 12 to be started.

Figure 2:
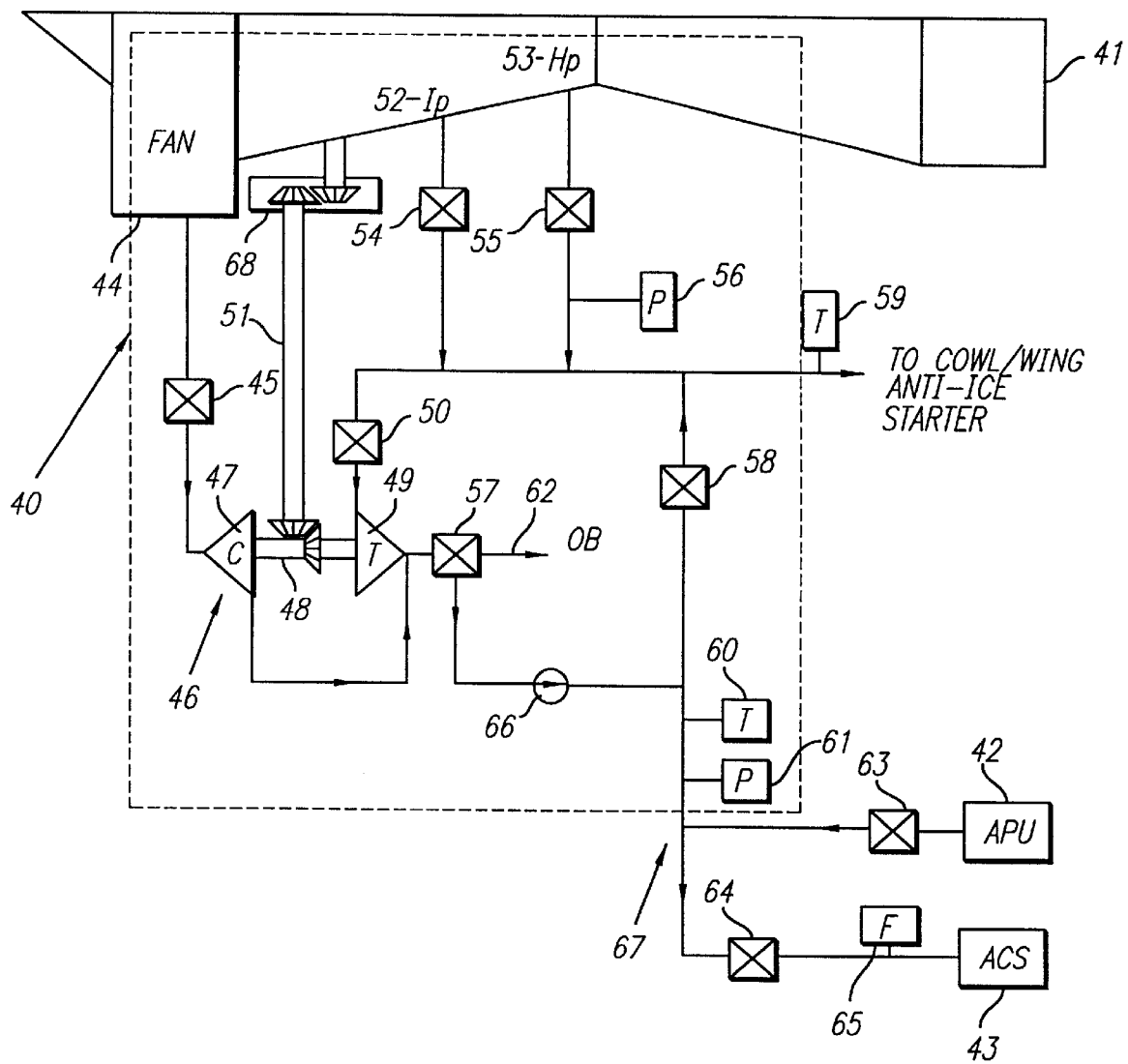
FIG. 2 is a schematic diagram of one embodiment of the present invention that provides integrated bleed air and an engine starting system.

In contrast to the prior art design depicted in FIG. 1, the present invention provides a single or integrated bleed air and engine starting system (IBANESS) 40, as shown by the dashed lines in FIG. 2. The system 40 includes an air turbine starter (ATS) subsystem 46 and an air flow subsystem 67. As further described below, the air turbine starter subsystem 46 generally includes a compressor 47 that is mechanically coupled to a turbine 49. Upstream of the turbine 49 inlet is a variable nozzle 50. The air flow subsystem 67, as further described below, includes various valves, sensors, and ducts that control the air flow between the ATS subsystem 46, an air cycle system (ACS) 43 of an environmental control system, and an auxiliary power unit (APU) 42 with one another. Thereby, the IBANESS 40 can operate in a first bleed air mode, a second bleed air mode, and an engine start mode.

According to the preferred embodiment shown in FIG. 2, the air flow (AF) subsystem 67 includes a bleed air source—specifically an intermediate pressure (Ip) air 52 and a high pressure (Hp) air 53—coming from an aircraft engine 41. The Ip air 52 passes through an intermediate pressure (Ip) valve 54 that supplies a flow to either the variable nozzle 50 or to a cowl/wing anti-ice system or engine start system via a temperature sensor 59 that senses the temperature of the flow. The cowl/wing anti-ice starter system does not form a part of the present invention and can be of any well known design in the art.

Through varying the opening of the variable nozzle 50, the pressurized air (i.e., the Ip air 52 or the Hp air 53) is controlled in terms of amount of flow and pressure into the turbine 49 of the ATS subsystem 46. The turbine 49 expands and thereby cools the pressurized air flow to produce an expanded air flow. The expanded flow mixes with a compressed air flow from the compressor 47 and moves into a diverter valve 57 that can be in one of two positions. In an overboard position, the diverter valve 57 diverts the mixed flow to overboard 62. In a feed position, the diverter valve 57 diverts the mixed flow to the supply of the ACS 43.

An air flow entering the compressor 47 is produced from a fan 44 that is part of the AF subsystem 67 and engine 41. The fan 44, however, need not always be operating in accordance with the present invention. When operating, the fan 44 produces a fan air flow through a fan air valve 45 that regulates the amount of flow passing therethrough. The fan air flow then moves into the compressor 47.

The compressor 47 compresses the fan air flow to provide a compressed air flow that can mix with an outlet or expanded flow from the turbine 49, as described above. A mixed air flow from the combination of expanded and compressed air flows moves through a check valve 66 that controls the passage of the flow. The flow then passes through a shut off valve 64 or through an isolation valve 58 that is part of the AF subsystem 67 and that can isolate the inlet of turbine 49 from receiving a flow.

If the mixed flow is to move through the shut off valve 64, the isolation valve 58 is in a closed position. The mixed flow can then pass a temperature sensor 60 that senses flow temperature and also a pressure sensor 61 that senses flow pressure. Once past the pressure sensor 61, the mixed flow moves through the shut off valve 64, then past a flow sensor 65 that controls the amount of flow, and finally into the ACS 43. The ACS 43 does not form an integral part of the present invention and can be constructed according to well know designs in the art.

When the mixed flow moves through the variable nozzle 50 and into the turbine 49, it can be seen in FIG. 2 that the turbine 49 mechanically drives the compressor 47 via a common shaft 48. The rotation of the common shaft 48, in turn, drives a gear shaft assembly 51. A gearbox 68 is actuated by the gear/shaft 51 to drive the engine 41 components needed to start the engine 41. Although not shown in FIG. 2, the gear shaft assembly 51 may be decoupled from the engine 41, such as by means of a sprag over-running clutch.

The operation of the integrated system 40 of the present invention can be characterized as being in one of three modes—a first bleed air mode, a second bleed air mode, and an engine start mode. In the first bleed air mode or aircraft cruising condition, the diverter valve 57 is in the mixing position, the isolation valve 58 is in the closed position, and the gear shaft assembly 51 is decoupled from the engine 41. Thereby, the Ip air 52 or the Hp air 53 is routed through the turbine 49. The turbine 49 drives the compressor 47 that, in turn, raises the pressure of the fan air. The fan air and expanded air from the turbine 49 are mixed and flowed to the ACS 43. The variable nozzle 50 controls the flow and pressure demands of the ACS 43 as a result of controlling the area of the variable geometry nozzle 50 of the turbine 49.

In the second bleed air mode or aircraft idle descent condition, the Ip air 52 will typically be deficient for operation of the ACS 43 and, therefore, the Hp air 53 is used. The variable nozzle 50 is in a fully closed position and the isolation valve 58 is in an open position. Doing so allows the Hp air 53 to bypass the ATS subsystem 46, including the turbine 49, and flow into the ACS 43.

The Ip air 52 is the primary source for use to the anti-ice system. However, if the Ip air 52 temperature is lower than the anti-ice system demands, the Hp air 53 can be mixed in by moving it through a high pressure valve 55 and past a pressure sensor 56.

In the engine start mode, the diverter valve 57 is in the overboard position, the variable nozzle 50 is in an open position, and the isolation valve 58 is in the open position. An auxiliary air flow from an auxiliary power unit 42 can then flow through a shut off valve 63 and to the turbine 49. In turn, the turbine 49 can drive the shaft 48 and gear/shaft assembly 51 which is coupled to an engine gearbox 68 for engine starting. The discharge from the turbine 49 mixed with the compressor air is then sent to overboard 62.

In contrast to the prior art design in FIG. 1, the present invention eliminates the separately provided engine start system 11, including the air turbine starter 30. In the prior art design, it can be seen that during aircraft operation, other than start-up, the engine start system 11 remains idle. In other words, the turbine starter 30 is not performing any useful work. If the engine start system 11 remains idle, but still results in fuel consumption because of the added weight, removing it eliminates a fuel penalty.

As also provided in the prior art design of FIG. 1, the heat exchanger 17 is used to cool air. By using the turbine 49 in the present invention to cool air, the heat exchanger 17 is eliminated and replaced by a component that is smaller in size and weight. This reduction in size and weight leads to a reduction in fuel consumption.

It can also be seen in the prior art design of FIG. 1 that the fan air from the fan 15 is dumped overboard after passing through the heat exchanger 17. In contrast, the present invention utilizes the fan air by mixing it with the expanded air from the turbine 49 to eventually supply the ACS 43. From the mixing, a flow multiplication effect results. In other words, since the fan air provides a cooling component to the mixed flow, the amount of expanded air that would be needed in the absence of the fan air is reduced. The reduction of needed expanded air reduces the amount of bleed air needed. Therefore, the penalties associated with the use of bleed air is necessarily reduced.

For those skilled in the art, it can be appreciated that the present invention provides an integrated system for supplying bleed air and starting an engine. The present system supplies air not only to start an engine but also to supply air to an environmental control system. In particular, the system of the present invention can start an engine while maximizing the use of existing aircraft components and thus minimizing associated fuel penalties. The present invention multiplies an air flow to supply an environmental control system, thereby lowering flow mixing temperatures and ram drag.

It should be understood, of course, that the foregoing relates to preferred embodiments of the invention and that modifications may be made without departing from the spirit and scope of the invention as set forth in the following claims.

What is claimed is:

1. An integrated bleed air and engine starting system for an engine, comprising:

an air turbine starter subsystem comprising a turbine mechanically coupled to said engine, a compressor mechanically coupled to said turbine, and a variable nozzle upstream of said turbine;

said variable nozzle having an open position that allows said bleed air to flow to said turbine; and an air flow subsystem that includes a diverter valve downstream of said turbine and an isolation valve upstream of said variable nozzle;

said diverter valve having a feed position that flows to an environmental control system a mixture of an exhaust from said turbine with a compressed air from said compressor;

whereby said air flow subsystem selectively directs said bleed air through said variable nozzle and to said turbine or through said isolation valve, around said turbine, and to said environmental control system, said air flow subsystem also enables an auxiliary air flow from an auxiliary power unit to flow to said isolation valve and be selectively received by said turbine.

2. The system of claim 1, further comprising a fan in air communication with said compressor and engine.

3. The system of claim 1, wherein said air turbine starter subsystem further comprises a common shaft disposed between said compressor and turbine and a gear/shaft assembly disposed between said common shaft and engine.

4. The system of claim 1, wherein said system is characterized by a first bleed air mode whereby said bleed air flows to said turbine which supplies air to said environmental control system.

5. The system of claim 1, wherein said system is characterized by a second bleed air mode whereby said bleed air bypasses said turbine and flows to said environmental control system.

6. The system of claim 1, wherein said system is characterized by an engine start mode whereby said auxiliary air flow is received by said turbine.

7. The system of claim 1, wherein said air flow subsystem further comprises a check valve downstream of said compressor and turbine.

8. The system of claim 7, wherein during a first bleed air mode of said system said diverter valve is in a feed position, said isolation valve is in said closed position, and said variable nozzle valve is in said open position.

9. The system of claim 8, wherein during said first bleed air mode said turbine is decoupled from said engine.

10. The system of claim 7, wherein during a second bleed air mode of said system said variable nozzle valve is in said closed position and said isolation valve is in an open position.

11. The system of claim 7, wherein during an engine start mode of said system said diverter valve is in an overboard position and said isolation valve is in an open position.

12. An integrated bleed air and engine starting system for an engine, comprising:

an air turbine starter subsystem comprising a compressor, a turbine coupled to said compressor and engine, and a variable nozzle intermediate said turbine and engine;

said variable nozzle having an open position in a first bleed air mode of said engine that allows said bleed air to flow to said turbine and said variable nozzle having a closed position in a second bleed air mode of said engine that precludes said bleed air from flowing to said turbine;

a fan in air flow communication with said compressor and engine; and an air flow subsystem that includes a diverter valve downstream of said turbine and an isolation valve upstream of said variable nozzle;

said diverter valve having a feed position in said first bleed air mode that feeds an exhaust from said turbine mixed with a compressed air from said compressor to an environmental control system and said diverter valve having an overboard position in an engine start mode of said engine that flows said turbine exhaust mixed with said compressed air out of said air flow subsystem;

said isolation valve having a closed position in said first bleed air mode an open position in said second bleed air mode, and said open position in said engine start mode;

whereby said air flow subsystem selectively directs said bleed air through said turbine in said first bleed air mode and engine start mode or around said turbine and to said environmental control system in said second bleed air mode, said air flow subsystem also enables an auxiliary air flow from an auxiliary power unit to be selectively received by said turbine in said engine start mode.

13. The system of claim 12, wherein said bleed air comprises one of an intermediate pressure air and a high pressure air.

14. The system of claim 12, wherein said air turbine starter subsystem further comprises a common shaft between said compressor and turbine and a gear/shaft assembly between said common shaft and engine.

15. The system of claim 12, wherein said air flow subsystem further comprises an intermediate pressure valve and a high pressure valve disposed between said engine and variable nozzle.

16. The system of claim 12, wherein said variable nozzle is intermediate said turbine and isolation valve.

17. The system of claim 12, wherein said isolation valve provides an auxiliary air flow from said auxiliary power unit to said turbine.

* * * * *